United States Patent Office 3,453,548
Patented July 1, 1969

3,453,548
CIRCUIT FOR CONVERTING THREE-PHASE POTENTIALS INTO TWO-PHASE POTENTIALS
Ronald Y. Paradise, Hillsdale, N.J., assignor to General Precision Inc., Little Falls, N.J., a corporation of Delaware
Filed Sept. 30, 1966, Ser. No. 583,348
Int. Cl. H03k 5/156
U.S. Cl. 328—24
8 Claims

ABSTRACT OF THE DISCLOSURE

The invention comprises a circuit including a pair of operational amplifiers resistively coupled to two leads of a three-position phase signal circuit and having feedback capacitors and a capacitor from the output of one of the operational amplifiers to the input of the other. The resistors are equal in value and the capacitors are so proportioned relative to each other so that one feedback capacitor is $\sqrt{3/2}$ times the second and the capacitor coupling output is one-half the value of the second. The respective outputs of these amplifiers produce a two-position phase output which is the same as would be produced by a Scott-T transformer receiving the same input. An alternative embodiment includes a third operational amplifier together with resistive coupling from its output to the inputs of the other, two operational amplifiers and having an input resistor which is equal to the output resistors and the input resistors to the other two amplifiers.

---

Figure 1:
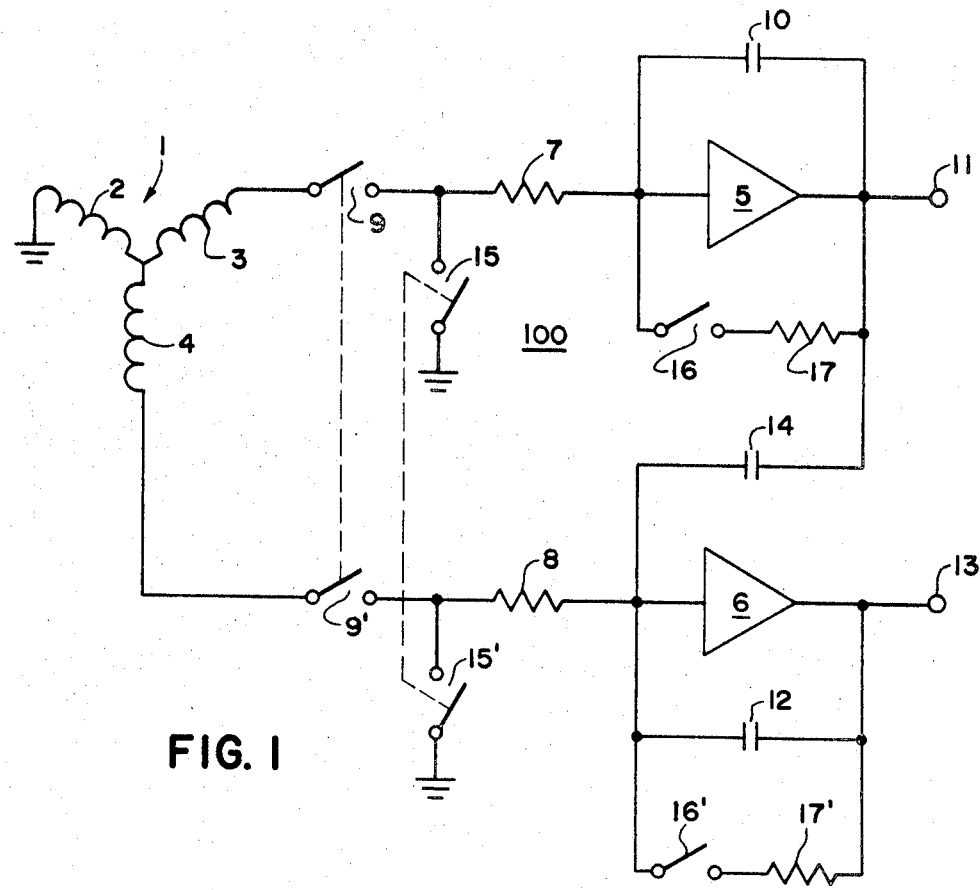

This invention relates to electrical translator circuitry and, more particularly to conversion systems effective to translate information from three wire, three position-phase signals to two or four wire, two position-phase signals.

In many systems, such as control systems, angular positions of elements, such as shafts, etc., are electrically designated by signals produced by synchro control transmitters. Typically, such control transmitters comprise a stator having three equally spaced, stationary electrical windings and a rotor with a single electrical winding rotatable with respect to the stator windings. The rotor winding is excitable by some alternating potential and a shaft or other element, whose orientation is to be indicated, is geared to the rotor so as to orient it directly or proportionally to the orientation of such a shaft. In this relationship, the orientation of the shaft and rotor results in output potentials produced by the three stator windings which are an indication of the shaft position. For example, when the rotor is excited by a sinusoidal potential, the three stator windings will produce potentials of $E \sin wt \sin \theta$, $E \sin wt \sin (\theta+120°)$ and $E \sin wt \sin (\theta+240°)$, wherein E represents the amplitude of the sinusotidal wave, w represents the frequency of the sinusoidal excitation wave, t represents time and $\theta$ represents the angle between the shaft position and some reference position.

Control transmitters of the resolver type, having a pair of stator windings disposed 90° with respect to each other and a rotor winding rotatable with respect thereto for producing output potential proportional to sine and cosine of the displacement angle, are also utilizable in such control systems. However, the three wire synchros possess certain inherent advantages as control transmiters. The three wire synchro inherently eliminates even harmonics and all harmonics that are integral multiples of three. As a consequence, the use thereof is more extensive. On the other hand, only two signals identifying the shaft angle in the form of sine and cosine of the angle of the shaft with respect to some reference position are adequate and in many control circuits are preferable over three wire signals. Consequently, translation of information with respect to the shaft angle from three wire systems to four wire, two phase systems is useful and affords the use of the preferred type of component in both cases.

Also, in various other environments, wherein it is required to translate signals from three position phase to two position phase, the present invention is applicable. As only one example among such other applications, in simulation systems employing direct current analog computers, the preesnt invention forms a component preceding such computer for applying the direct signals thereto.

Translation from such three wire, three phase systems to two or four wire, two phase systems has been effected with considerable success by the use of the Scott-T transformer. The Scott-T, however, in addition to being somewhat sensitive to null harmonics and noise and requiring careful stabilization of certain associated circuitry, such as buffer amplifiers required with its use is heavy and in cases requiring sampling or derivation of signals therefrom, this must be accomplished in a very short interval of time because such signal is continuously varying. This renders such conversions susceptible to noise and other errors inherent in the system, particularly when accentuated during the sampling interval.

Accordingly, it is a principal object of this invention to facilitate conversion of three wire, three phase signals into two or four wire, two phase signals with reduced sensitivity to noise and null harmonics and with circuitry that is easier to stabilize and to concomitantly provide a fixed, invariable output potential for conversion times and which is not subject to errors.

In accordance with this invention, these and other objects and advantages are facilitated by a pair of phase inverting, summing amplifiers, a first one of which receives as its input, the output of one line of a three phase system, and the second one of which receives as its two inputs, another output of the three phase system and the output of the first phase inverting amplifier. Each amplifier has a capacitive feedback loop from output to input and the output of one amplifier is capacitively coupled to the input of the other amplifier. By proper proportioning of the coupling between amplifiers and of the feedback coupling so that the feedback coupling of the second is $\sqrt{3/2}$ times the feedback coupling of the first, and the cross-coupling from the first to the second is ½ that of the feedback coupling of the first, output signals are derived which are proportional in magnitude to the sine and cosine, respectively, of the shaft angle or position of other element.

Thus, by the provision of appropriate switching for disconnecting the input to this circuit, an integration and hold operation for deriving a stable, fixed potential for sampling may be facilitated. The additional provision for appropriately discharging the feedback capacitor may be provided by a capacitor shunting circuit. Accordingly, both the translation and integration and held operations may be incorporated into the one circuit.

In some application utilizing a three winding synchro as a transmitter unit, because of the equipment utilizing the signals produced by the synchro, it may be necessary that all three windings of the synchro be ungrounded. In accordance with one embodiment of this invention, provision is made for use of a three wire synchro with all windings ungrounded with the provision that the common internal connection of the three windings be maintained at alternating or direct potential within a few volts of ground. In this embodiment, an additional amplifier circuit is required and receives its input from the winding which would otherwise be grounded. The additional amplifier employs a resistive feedback circuit and its output is applied through resistive elements to the input of the other two amplifiers.

Figure 3:
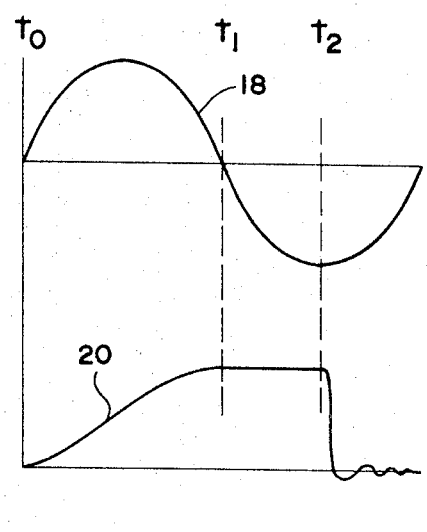
Figure 2:
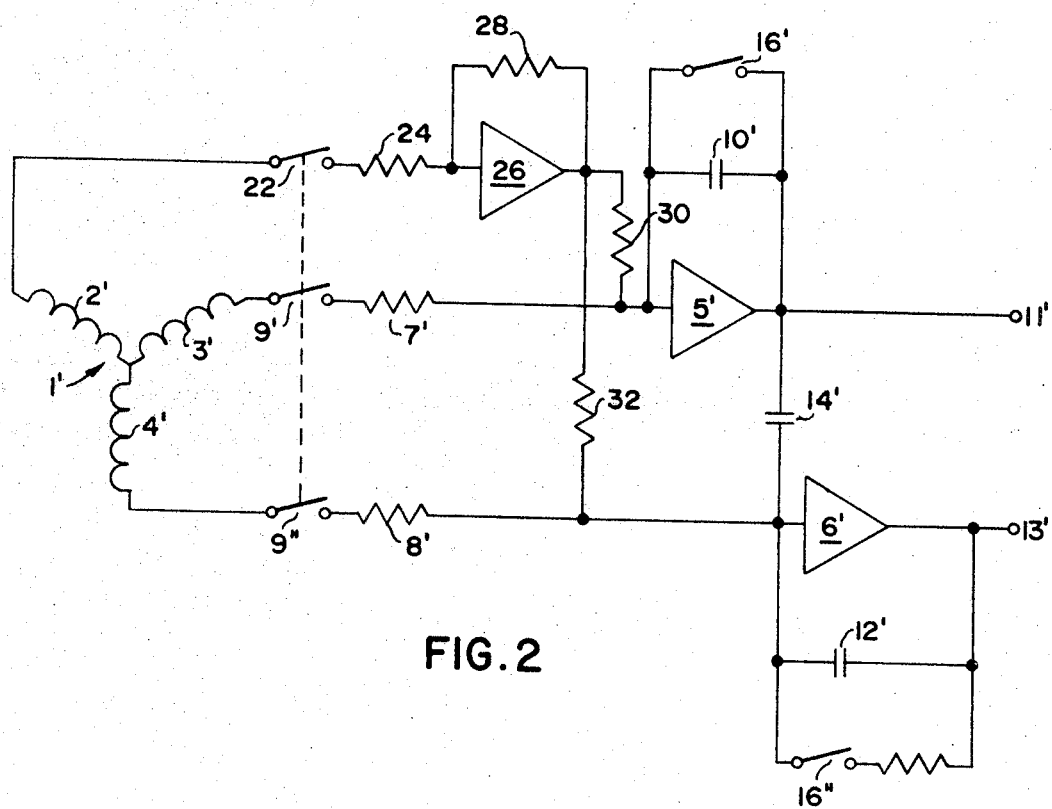

Other and further objects and advantages of the invention will become apparent from the following detailed description thereof taken with the accompanying drawings in which:

FIGURES 1 and 2 are schematic representations of alternative embodiments of the invention having respectively grounded and ungrounded inputs and utilizing capacitive feedback and cross-coupling between amplifiers and including a provision for deriving an integrated signal which may be maintained for a prolonged period for application to other circuit components; and FIGURE 3 is a graph showing typical input and output potentials of an integrating circuit.

Referring now more particularly to the drawings for a detailed description of the invention, in FIGURE 1, I represents a typical synchro having three stator windings 2, 3 and 4 and a rotor, not shown, having a winding rotatable relative to each of these windings. The rotor winding in response to appropriate excitation induces potentials in the stator windings which are a function of the angle between the individual stator winding and the winding of the rotor. Accordingly, the position of a shaft connected to the rotor will be represented by the potentials produced across these windings. The three windings are joined at one end in the form of a Y-connection. The other end of winding 2 is connected to ground in this embodiment of the invention wherein the circuitry or equipment with which the invention is associated does not require an ungrounded synchro transmitter. The other ends of synchro windings 3 and 4 provide the inputs to the circuit of this invention represented generally at 100. The circuit 100 includes a first amplifier 5 and a second amplifier 6. Amplifiers 5 and 6 are of a type having a very high input impedance but yet having input terminals at potentials near ground. The inputs to these amplifiers are derived from respective synchro windings 3 and 4. The windings 3 and 4 are connected through respective resistors 7 and 8 and respective switches 9 and 9' to the amplifier inputs. The switches 9 and 9' are preferably electronic in nature, although they are shown merely as mechanical switches for purposes of simplicity and ease of explanation. These switches are operable in unison as designated by the dotted line interconnecting the same and serve to interrupt the input lines and assure a condition of zero input to circuit 100 under certain conditions as will be described hereinbelow. A feedback capacitor 10 is connected between output terminal 11 and the input of amplifier 5 and a similar feedback capacitor 12 is connected between the output terminal 13 and the input of amplifier 6. These amplifiers, together with the capacitors so connected, each form a summing or integrating circuit effective to produce an integral of the potential applied at the input thereto. An intercoupling between these amplifiers is provided by a capacitor 14 connected between the output of amplifier 5 and the input to amplifier 6. Thus, the amplifier circuit 5 integrates the potential received from synchro winding 3 and the amplifier circuit 6 integrates the potential received from synchro winding 4, together with the potential appearing at output terminal 11.

For facilitating the production of a steady output potential of the circuit 100 for a prolonged interval of time, the switches 9 and 9' are coupled for actuation in unison to open the circuit input lines to the circuit 100 and for further assuring the absence of input potential signal to the circuit 100 during such intervals; a pair of further switches 15 and 15', coupled for actuation in unison, are provided for selectively connecting the input lines of the circuit 100 to ground. For selectively discharging capacitors 10 and 12, switches 16 and 16' are serially connected with respective resistors 17 and 17' across these capacitors. The switches 16 and 16' are electronic in nature and resistors 17 and 17' are of such a low value that on closure of switches 16 and 16' capacitors 10 and 12 discharge within one-half cycle of the carrier wave.

The resistors 7 and 8 are capacitors 10, 14 and 12 in the circuit 100 are preferably of the precision type with close tolerances and the amplifiers 5 and 6 are such as to produce very low distortion in the operating ranges thereof and are of high gain, greater than ten thousand. The input terminals of these amplifiers are substantially at ground potential and the input impedances are so high that the current flow therein in response to externally applied potentials are so low that they may be disregarded.

In accordance with an important feature of this invention, resistors 7 and 8 are of equal value, the capacitor 12 has a value of $\sqrt{3/2}$ times that of capacitor 10 and capacitor 14 has a value of one-half that of capacitor 10. Stated otherwise, the feedback coupling for amplifier 6 is $\sqrt{3/2}$ times that for amplifier 5 and the cross-coupling is ½ that of the feedback coupling for amplifier 5. By such a proportioning of capacitor values, the circuit 100 is responsive to the potentials received from the synchro 1 to produce at its respective outputs 12 and 13, potentials proportional, respectively, to the sine and cosine of the synchro rotor winding position relative to the stator.

In the circuit of FIGURE 1, with switch 9 closed, the output potential at terminal 11, in response to an input potential $E \sin \theta \sin wt$, is proportional to the integral of this input potential, namely, $$e_{11} = \frac{1}{R_7 C_{10}} \int E \sin \theta \sin wt \, dt = \frac{E \sin \theta}{R_7 C_{10}} \int \sin wt \, dt$$

This expression indicates, therefore, that this output potential is a function of the sine of the rotor winding angle relative to a reference.

The potential produced at an output terminal 13 is dependent upon the potential applied from winding 4 through resistor 8 and also upon the potential applied from the output terminal 11 through capacitor 14.

Since the amplifiers 5 and 6, within their operating ranges, possess the characteristics of having input terminals at virtual ground potential yet presenting a substantial input impedance, the equation of performance of amplifier 6 can be expressed:

$$\frac{e_i}{R_8} + C_{14} \frac{de_{11}}{dt} + C_{12} \frac{d}{dt} e_{13} = 0$$

wherein:

$e_i$ = input potential to resist or 8
$e_{11}$ = potential at output terminal 11
$e_{13}$ = potential at output terminal 13.

Since $C_{14} = \frac{1}{2} C_{10}$ and $$C_{12} = \frac{\sqrt{3}}{2} C_{10}$$

$$-\frac{dt}{d} e_{13} = \frac{2}{\sqrt{3}} C_{10} \left[ \frac{e_i}{R} + \frac{C_{10}}{2} \frac{d}{dt} e_{11} \right]$$

the potential of stator winding 4 may be taken in either polarity, that is, as $E \sin wt \sin (\theta+120°)$ or $$-E \sin (\theta+120°)$$

The latter expression is equal to $E \sin wt \sin (\theta-60°)$. Thus, $$-\frac{d}{dt}e_{13} = \frac{2}{\sqrt{3}C_{10}}\left[\frac{E \sin (\theta-60°) \sin wt}{R_8} + \frac{C_{10}}{2}\frac{E}{R_7C_{10}}(-\sin \theta \sin wt)\right]$$

Since $R_8 = R_7$ $$-\frac{d}{dt}e_{13} = \frac{2E \sin wt}{\sqrt{3}C_{10}R_8}[\sin \theta \cos 60° - \cos \theta \sin 60° - \tfrac{1}{2}(\sin \theta)]$$

$$= \frac{2E \sin wt}{\sqrt{3}C_{10}R_8}\left(-\frac{\sqrt{3}}{2}\cos \theta\right)$$

$$\frac{d}{dt}e_{13} = \frac{E \sin wt \cos \theta}{C_{10}R_8}$$

$$e_{13} = \frac{E \cos \theta}{C_{10}R_8}\int \sin wt \, dt$$

Again, it is to be observed that the output of amplifier 6 of circuit 100 is proportional to the cosine of $\theta$ which is the angle between the rotor of synchro 1 and some reference. Thus, the circuit 100 provides output potentials proportional to sine and cosine, respectively, of the input displacement and the circuit performs the equivalent of a Scott-T transformer. In the operation of the circuit of FIGURE 1, the switches 9 and 9' are closed, switches 15, 15', 16 and 16' are open. During the interval of the first one-half cycle of the input wave as shown from time $t_0$ to $t_1$ at 18 in FIGURE 3 of the drawings, the circuit provides at its output terminal 13 a potential which is proportional to the integral of the wave 18, as shown at 20 in FIGURE 3. Since the integral is a maximum at time $t_1$, namely, after the first one-half cycle of the input potential, at this time switches 9 and 9' are opened and switches 15 and 15' are closed to thus assure that no interfering input signals or noise will be applied to the amplifier inputs. Switches 16 and 16' are retained open for the integrating interval from $t_1$ to $t_2$ during which the potential at either output of the circuit 100 is utilized in providing a signal input to other circuitry. Because of the prolonged time interval during which this potential is available, and because the amplifier input is zero, it is significantly free of interfering transients, harmonics and noise which may appear on the output potential in the absence of such maintained integrated potential. After the potential appearing at the output terminals is utilized in other circuitry, the amplifier circuit may be reset to an initial condition by the closure of switches 16 and 16', thus, discharging the capacitors 10 and 12. To assure a rapid discharge the resistors 17 and 17' are of a relatively low value so that the potential including transients is reduced to zero and the circuit is reset before the beginning of the next cycle of the input potential. From the foregoing, it is observed that the circuit of FIGURE 1 of the drawings possesses the inherent quality that it facilitates the steady, accurate output with the mere addition of the switching circuitry described. Thus, the dual functions of translation from three phase to two phase and the provision of a steady, accurate output potential over a relatively prolonged interval are provided in a single circuit.

It should be understood that the circuit of FIGURE 1 may be modified by the addition of appropriate circuitry for inverting the phase of each of its outputs to provide a four wire, two phase system and further that appropriate drift compensating components may be provided, as necessary and required by the system in which the circuit forms a component. In any case, however, such circuits incorporate the inventive features as described herein.

In FIGURE 2 of the drawings, circuit components analogous to components in FIGURE 1 are designated by the same numeral primed or, in the case of a primed numeral in FIGURE 1, the analagous component in FIGURE 2 is designated by the same numeral with a double prime.

In FIGURE 2, winding 2' is ungrounded and connected through a switch 22 and resistor 24 in series, to the input of an amplifier 26. The switch 22 is operable in unison with switches 9' and 9" as indicated by the dotted line interconnecting these switches, whereby all three input lines may be interrupted and synchro 1 disconnected by the opening of these switches. Amplifier 26 is substantially identical to amplifiers 5' and 6', however, the feedback circuit in the case of amplifier 26 is by a resistor 28 interconnected between output and input of the amplifier. The output of amplifier 26 is applied to the inputs of amplifiers 5' and 6' through respective resistors 30 and 32 connected between the output of amplifier 26 and the inputs of respective amplifiers 5' and 6'. In this circuit, the resistors 7', 8', 24, 28, 30 and 32 are selected to be of substantially the same value of resistance and the capacitors 10', 12' and 14' are proportioned in the ratio $C$, $$\frac{\sqrt{3}}{2}C$$

and $\tfrac{1}{2}C$. In this circuit, the junction between windings 2', 3' and 4' is operated at very low alternating and direct potentials, preferably near zero, and the circuit in response to three position phase signals produced by synchro 1' produces two position phase signals at output terminals 11' and 13', proportional to sine and cosine, respectively, of the position of a rotor, not shown, of synchro 1'.

What is claimed is:

1. An electrical circuit comprising: a pair of summing amplifiers each including a capacitive feedback coupling from the output to the input thereof, capacitive coupling means between the output of one of said amplifiers to the input of the other amplifier and impedance means in the input to each of said amplifiers and being of substantially the same value, a third summing amplifier having a resistive feedback coupling from its output to its input and having its output coupled by substantially equivalent resistance means to respective inputs of said one and other amplifiers, impedance input means in the input of said third amplifier and being of a value substantially equivalent to the input impedance of said one or other amplifier.

2. An electrical circuit comprising: a pair of summing amplifiers each including a capacitive feedback coupling from the output to the input thereof, capacitive coupling means between the output of one of said amplifiers to the input of the other amplifier and impedance means in the input to each of said amplifiers and being of substantially the same value wherein the capacitive coupling between output and input of said other amplifier is $\sqrt{3/2}$ times the capacitive feedback coupling of said one amplifier and the coupling from the output of said one amplifier to the input of the other amplifier is $\tfrac{1}{2}$ that of the feedback coupling of said one amplifier, said circuit additionally comprising switch means and a conductive circuit in series with each capacitive feedback coupling respectively for selectively discharging said capacitors to reset the circuit.

3. An electrical circuit, according to claim 2, wherein the respective input impedance means are resistors of substantially equal value.

4. An electrical circuit, according to claim 1, additionally comprising switch means for simultaneously selectively interrupting the input lines to each of said amplifiers and for connecting the same to ground.

5. An electrical circuit, according to claim 4, additionally comprising a conductive circuit selectively connectable across the terminals of said capacitor for resetting the circuit to an initial condition.

6. An electrical circuit, according to claim 3, additionally comprising switch means for simultaneously interrupting the input lines to said amplifiers and for connecting the same to ground.

7. An electrical circuit, according to claim 6, additionally comprising further switch means and a conductive circuit in series with the switch means connected across each of said feedback capacitive coupling means for selectively discharging said capacitors to reset the circuit.

8. An electrical circuit, according to claim 1, wherein the capacitive coupling between output and input of said other amplifier is $\sqrt{3/2}$ times the capacitive feedback coupling of said one amplifier and the coupling from the output of said one amplifier to the input of the other amplifier is ½ that of the feedback coupling of said one amplifier, and wherein the input impedance means to all three of said amplifiers, the resistive feedback means of said third amplifier and the resistive couplings from the output of said third amplifier to the inputs of said one and other amplifier are respective resistors of substantially equal value.

References Cited

UNITED STATES PATENTS

| | | | |
|---|---|---|---|
| 2,917,626 | 12/1959 | Usher | 328—127 |
| 2,983,880 | 5/1961 | McFadden | 328—127 XR |
| 3,386,029 | 5/1968 | Brinkman | 321—54 |

ARTHUR GAUSS, *Primary Examiner.*

S. D. MILLER, *Assistant Examiner.*

U.S. Cl. X.R.

321—54, 56; 323—108; 328—127, 143